(12) United States Patent  
Kuo

(10) Patent No.: US 8,745,300 B2  
(45) Date of Patent: Jun. 3, 2014

(54) AUXILIARY DEVICE FOR CAMERA MODULE TEST

(75) Inventor: Bor-Woei Kuo, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 212 days.

(21) Appl. No.: 13/337,312

(22) Filed: Dec. 27, 2011

(65) Prior Publication Data

US 2013/0124771 A1    May 16, 2013

(30) Foreign Application Priority Data

Nov. 14, 2011    (TW) .............................. 100141493 A

(51) Int. Cl.  
G06F 13/36    (2006.01)

(52) U.S. Cl.  
USPC ......................................................... 710/310

(58) Field of Classification Search  
USPC .................................................. 710/52, 310  
See application file for complete search history.

(56) References Cited

U.S. PATENT DOCUMENTS

| | | | |
|---|---|---|---|
| 5,991,546 A * | 11/1999 | Chan et al. ....................... 710/62 |
| 6,040,792 A * | 3/2000 | Watson et al. ................. 341/100 |
| 7,010,638 B2 * | 3/2006 | Deng et al. ..................... 710/306 |
| 7,895,365 B2 * | 2/2011 | Rofougaran et al. ............. 710/2 |
| 8,060,670 B2 * | 11/2011 | Yu et al. ............................ 710/62 |
| 8,223,796 B2 * | 7/2012 | Pourbigharaz et al. ........ 370/466 |
| 8,305,456 B1 * | 11/2012 | McMahon ................. 348/218.1 |
| 8,311,929 B2 * | 11/2012 | Rofougaran et al. ........... 705/37 |
| 8,504,755 B2 * | 8/2013 | Beadnell et al. .............. 710/313 |
| 2011/0285866 A1 * | 11/2011 | Bhrugumalla et al. .... 348/218.1 |
| 2012/0054392 A1 * | 3/2012 | Li ................... 710/110 |
| 2012/0084469 A1 * | 4/2012 | Tang et al. ....................... 710/53 |
| 2012/0102257 A1 * | 4/2012 | Lin et al. ....................... 710/315 |
| 2013/0031568 A1 * | 1/2013 | Tamir et al. .................... 719/318 |

* cited by examiner

Primary Examiner — Paul R Myers  
(74) Attorney, Agent, or Firm — Novak Druce Connolly Bove + Quigg LLP

(57) ABSTRACT

An auxiliary device includes a first interface of a bandwidth higher than about 1 Gbps for connecting a camera module, a second interface of a bandwidth higher than about 1 Gbps for connecting an image analysis device, a buffer, and a processor connected to the first interface, the second interface, and the buffer. The processor reads commands, which contain a set of predetermined parameters of the camera module, via the second interface and transmits the set of predetermined parameters to the camera module via the first interface. The processor also reads frames of image from the camera module to the buffer via the first interface at a rate above about 1 Gbps, and reads the frames of image from the buffer to the image analysis device frame by frame via the second interface at a rate above about 1 Gbps.

5 Claims, 2 Drawing Sheets

AUXILIARY DEVICE FOR CAMERA MODULE TEST

BACKGROUND

1. Technical Field

The present disclosure relates to camera modules and, particularly, to an auxiliary device for use in the testing of a camera module.

2. Description of Related Art

To ensure quality, camera modules need to pass various tests. In one of the tests, the camera module captures images with required parameters and transmits the images to an image analysis device. The image analysis device analyzes the images to determine whether the camera module passes the test. To increase efficiency while ensuring accuracy, it is required that the camera module are operated exactly within the required parameters and transmit the images at a relative high rate without data loss. Therefore, it is desirable to provide an auxiliary device for the test to meet the requirements.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Figure 1:
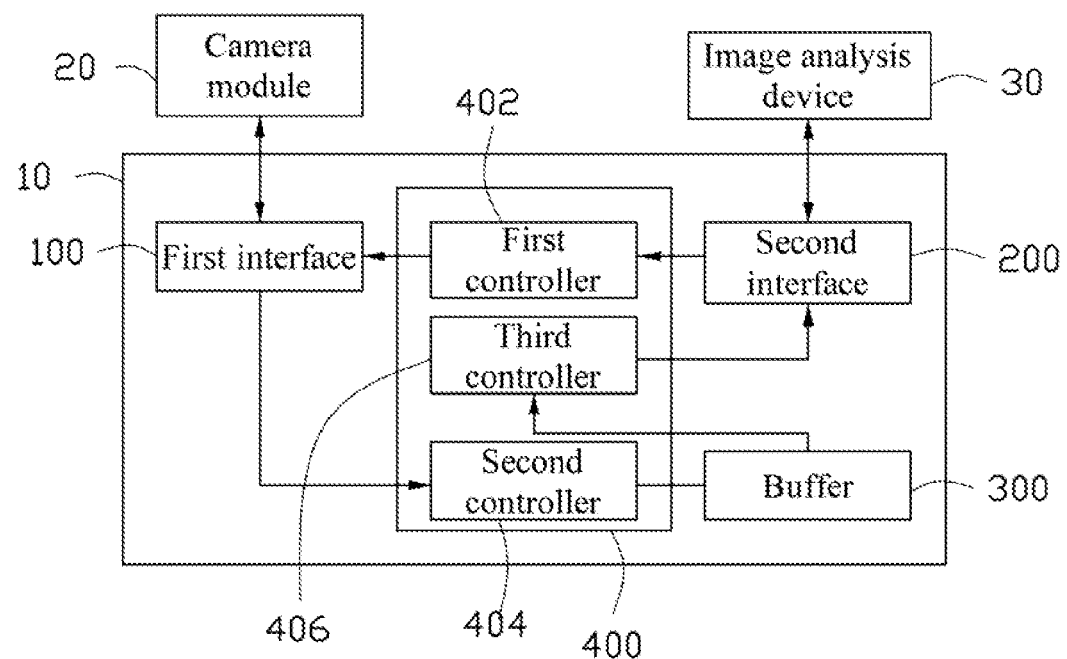
FIG. 1 is a functional diagram of an auxiliary device, according to an embodiment.

Embodiments of the present disclosure will now be described in detail with reference to the drawing.

FIG. 1, an auxiliary device 10 connects a camera module 20 to an image analysis device 30 and transmits information therebetween at a high transmission rate to support a test of the camera module 20. The test of the camera module 20 requires that the camera module 20 captures frames of an image with a set of predetermined parameters, such as, a predetermined resolution, vertical sync, and frame rate, for example, and transmits the frames of the image to the image analysis device 30, such as a computer with an image analysis program, to determine whether the camera module 20 passes the test. The set of predetermined parameters can configure the camera module 20 such that format and content of the frames of the image comply with requirements/conditions of the test.

The auxiliary device 10 includes a first interface 100 of a bandwidth higher than about 1 gigabits per second (Gbps) for connecting the camera module 20, a second interface 200 of a bandwidth higher than about 1 Gbps for connecting the image analysis device 30, a buffer 300, and a processor 400 for connecting the first interface 100, the second interface 200, and the buffer 300. The processor 400 includes a first controller 402, a second controller 404, and a third controller 406. The first controller 402 receives commands from the image analysis device 30 via the second interface 200, which includes the set of predetermined parameters, and sends the set of predetermined parameters to the camera module 20 via the first interface 100 to configure the camera module 20 accordingly. The second controller 404 receives frames of an image from the camera module 20 via the first interface 100 at a first predetermined rate higher than about 1 Gbps and buffers the frames of the image in the buffer 300. The third controller 406 reads and sends the frames of an image frame by frame from the buffer 300 to the image analysis device 30 at a second predetermined rate higher than about 1 Gbps via the second interface 200.

As such, the camera module 20 is operated with the set of specific parameters and accordingly the format and content of the frames of the image comply with the requirements/conditions of the test. Also, a high-speed transmission is realized by the employment of the first interface 100, the second interface 200, the first controller 402, and the third controller 406. In addition, the employment of the buffer 300 can compensate a difference between the first predetermined rate and the second predetermined rate such that the transmission at the second predetermined rate is ensured. The frames of the image transmitted frame by frame can ensure the entirety of each frame of the image, such that data loss can be avoided or at least greatly reduced.

The camera module 20 can be used in various electronic devices such as cell phones or notebook computers, for example. As such, the first interface 100 can be connected to the camera module 20 via the electronic device.

The first interface 100 can be a mobile industry processor interface (MIPI) having two lanes, each of which has a bandwidth about 800 Mbps, that is to say, a total bandwidth of the first interface 100 is about 1.6Gbps. The second interface 200 can be a universal serial bus 3.0 (USB 3.0) connector, which has a bandwidth about 2.0Gbps. As such, if a size of each frame of image is about 800 Mb, the bandwidth of the second interface 200 can be alternatively expressed as 15 frames per second (fps), that is, the second interface 200 can receive and send 15 frames in a second.

The buffer 300 can be a double data rate synchronous dynamic random access memory (DDR2) and has a storage capacity higher than about 10 gigabits (Gb). As such, the buffer 300 can buffer about or more than ten frames of the image.

The processor 400 can be a field programmable gate array (FPGA) which complies with the first interface 100 and the second interface 200.

Figure 2:
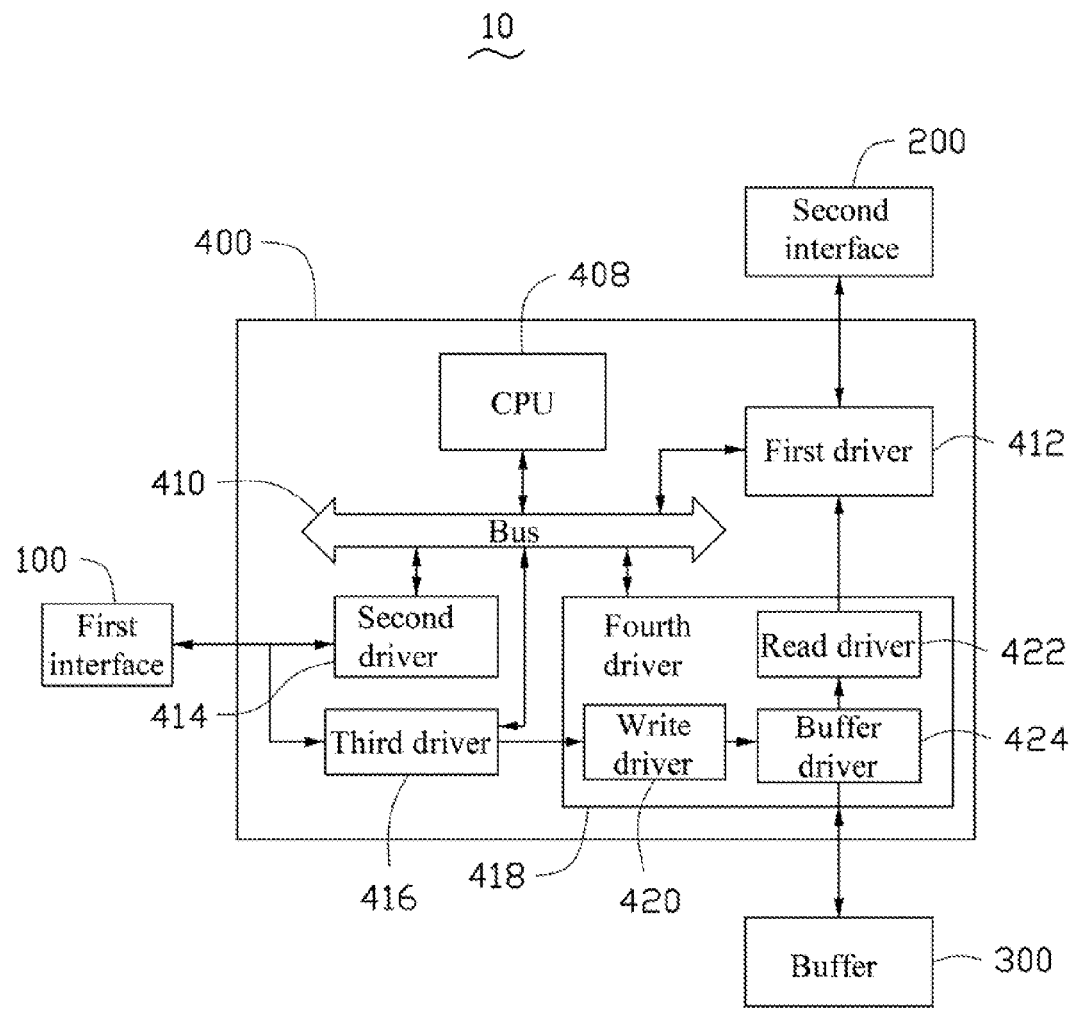
FIG. 2 is a functional diagram of an auxiliary device, according to another embodiment.

FIG. 2, in another embodiment, the processor 400 can include a central processing unit (CPU) 408, a bus 410, a first driver 412, a second driver 414, a third driver 416, and a fourth driver 418. The first driver 412, the second driver 414, the third driver 416, and the fourth driver 418 communicate with the CPU 408 via the bus 410. The bus 410, the first driver 412, and the second driver 414 cooperatively realize the function of the first controller 402. The CPU 408, the bus 410, the third driver 416, and the fourth driver 418 cooperatively realize the function of the second controller 404. The CPU 408, the bus 410, the fourth driver 418, and the first driver 412 cooperatively realize the function of the third controller 406.

In detail, the CPU 408 controls the first driver 412 to drive the second interface 200 to read the commands and decode the commands. The first driver 412 can be a USB 3.0 driver when the second interface 200 is a USB 3.0 connector. In addition to the set of predetermined parameters, the commands can further includes specific transmission parameters of the first interface 100 and the second interface 200, and driving parameters of the first driver 412, the second driver 414, the third driver 416, and the fourth driver 418.

The second driver 414 reads the commands via the bus 410 and drives the first interface 100 to transmit the set of predetermined parameters to the camera module 20 according to the driving parameters contained in the commands. In this embodiment, the second driver 414 can be an inter-integrated circuit (I2C) driver.

The third driver 416 reads the commands via the bus 410 and drives the first interface 100 to read the frames of image from the camera module 20 according to the driving parameters contained in the commands.

The fourth driver 418 reads the commands via the bus 410 and drives the writing of the frames of the image from the third driver 416 into the buffer 300 according to the driving parameters contained in the commands. The fourth driver 418 also writes the frames of the image frame by frame in the buffer 300. The first driver 412 also drives the second interface 200 to transmit each entire frame of the image to the image analysis device 30.

The fourth driver 418 includes a write driver 420, a buffer driver 424, and a read driver 422. The write driver 420 drives the buffer driver 424 to write the frames of the image into the buffer 300. The read driver 422 drives the buffer driver 424 to read the frames of image from the buffer 300 frame by frame. The buffer driver 424 can be a DDR2 driver when the buffer 300 is a DDR2 and can be a multi-port DDR2 driver to support more than one DDR 2.

It will be understood that the above particular embodiments are shown and described by way of illustration only. The principles and the features of the present disclosure may be employed in various and numerous embodiment thereof without departing from the scope of the disclosure as claimed. The above-described embodiments illustrate the possible scope of the disclosure but do not restrict the scope of the disclosure.

What is claimed is:

1. An auxiliary device configured for connecting a camera module to an image analysis device, the auxiliary device comprising:

a first interface for connecting the camera module;

a second interface for connecting the image analysis device;

a buffer; and a processor connected to the first interface, the second interface, and the buffer, the processor comprising:

a first controller connected to the first interface and the second interface directly, the first controller being configured for reading commands via the second interface, the commands containing a set of predetermined parameters of the camera module, and the first controller being also configured for transmitting the set of predetermined parameters to the camera module via the first interface, a second controller configured for reading frames of image from the camera module to the buffer via the first interface at a rate above about 1 Gbps; and a third controller configured for reading the frames of image from the buffer to the image analysis device frame by frame via the second interface at a rate above about 1 Gbps.

2. The auxiliary device of claim 1, wherein the first interface and the second interface both have a bandwidth higher than about 1 Gbps.

3. The auxiliary device of claim 1, wherein the first interface is a 2-lane MIPI.

4. The auxiliary device of claim 1, wherein the second interface is a USB 3.0 connector.

5. The auxiliary device of claim 1, wherein the first interface is also connected to the second interface through, in this order, the second controller, the buffer, and the third controller.

* * * * *